July 2, 1940.  C. M. TUTTLE ET AL  2,206,138
METHOD AND APPARATUS FOR PERFORATING MOTION PICTURE FILMS
Filed March 15, 1939  3 Sheets-Sheet 1
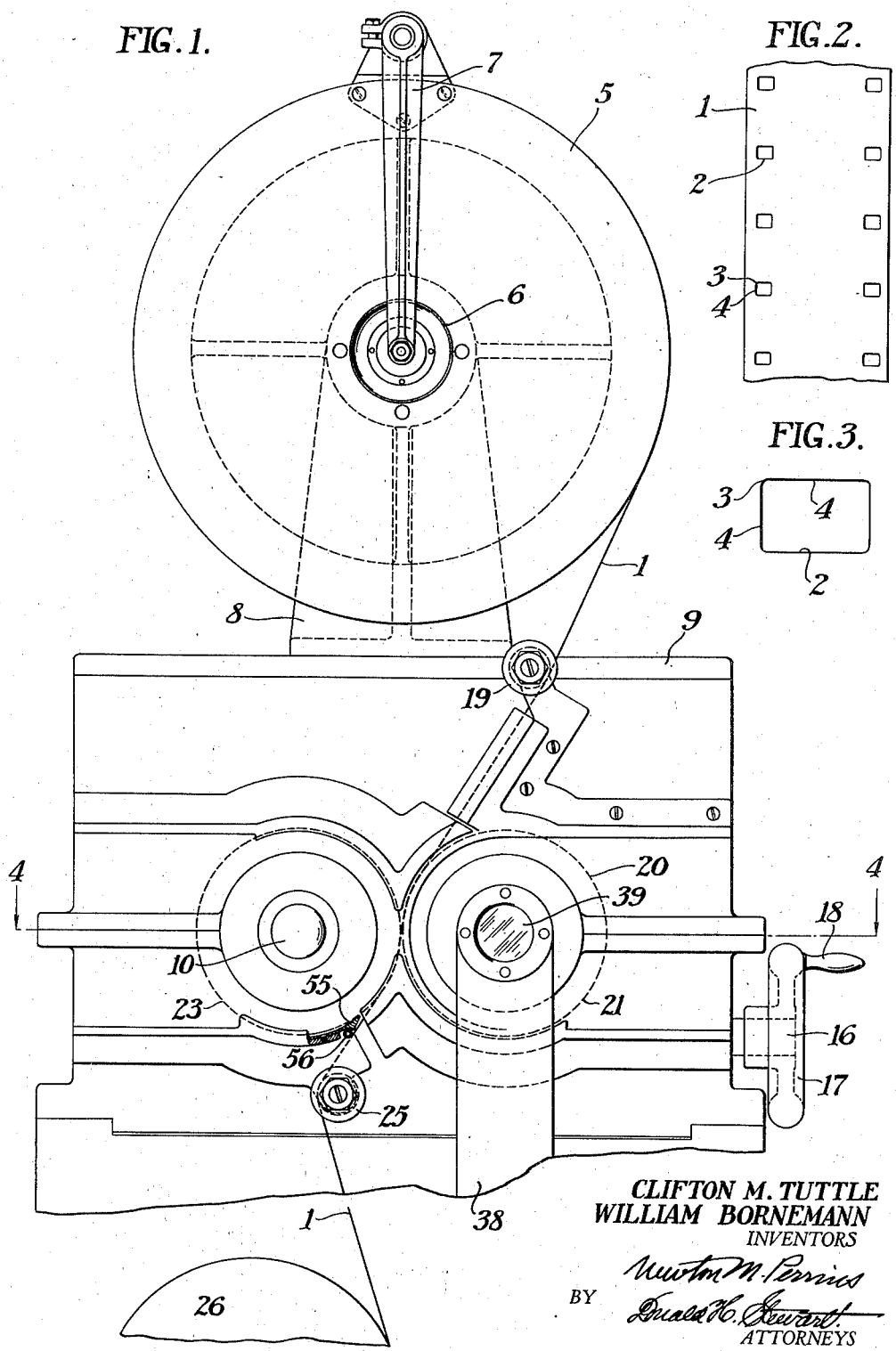
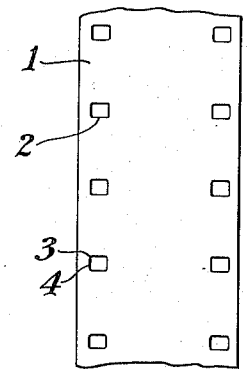
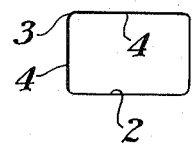
FIG.1.
FIG.2.
FIG.3.
CLIFTON M. TUTTLE
WILLIAM BORNEMANN
INVENTORS
BY
ATTORNEYS July 2, 1940. C. M. TUTTLE ET AL 2,206,138
METHOD AND APPARATUS FOR PERFORATING MOTION PICTURE FILMS
Filed March 15, 1939 3 Sheets-Sheet 2

CLIFTON M. TUTTLE
WILLIAM BORNEMANN
INVENTORS

BY
ATTORNEYS

July 2, 1940.　　　C. M. TUTTLE ET AL　　　2,206,138
METHOD AND APPARATUS FOR PERFORATING MOTION PICTURE FILMS
Filed March 15, 1939　　　3 Sheets-Sheet 3
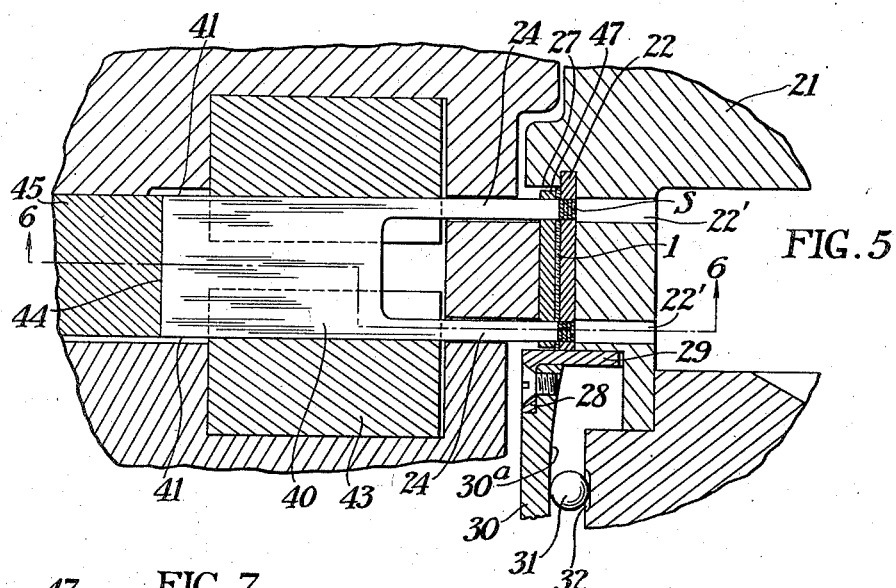
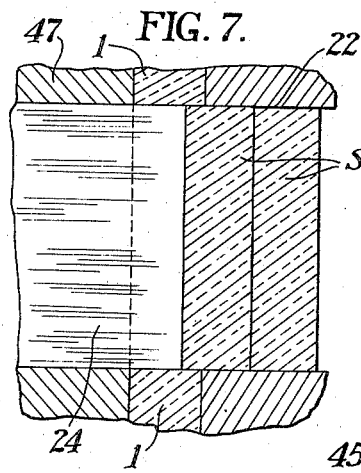
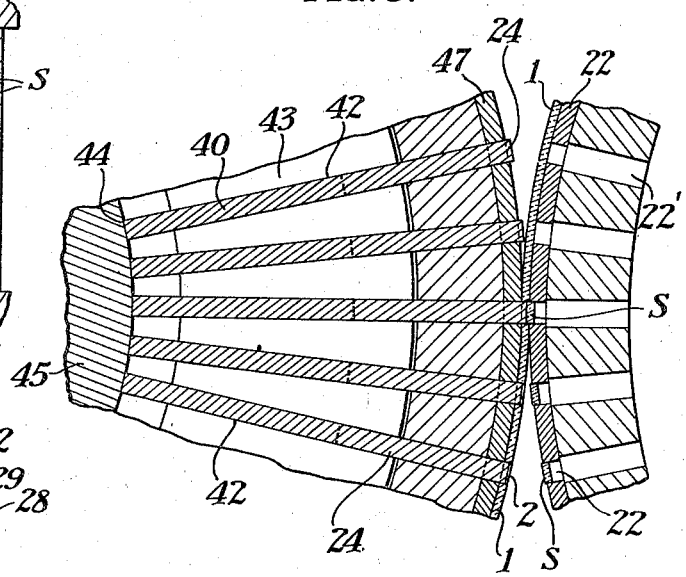
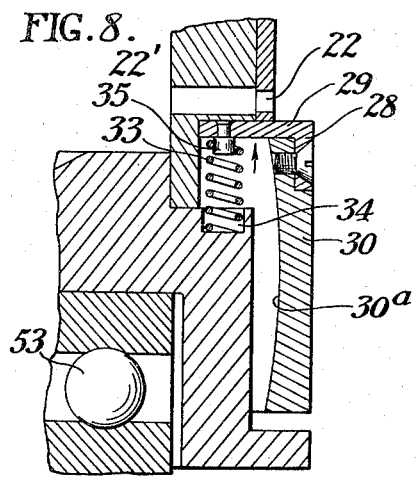
CLIFTON M. TUTTLE
WILLIAM BORNEMANN
INVENTORS
BY
ATTORNEYS Patented July 2, 1940

2,206,138

UNITED STATES PATENT OFFICE 2,206,138

METHOD AND APPARATUS FOR PERFORATING MOTION PICTURE FILMS

Clifton M. Tuttle and William Bornemann, Rochester, N. Y., assignors to Eastman Kodak Company, Rochester, N. Y., a corporation of New Jersey Application March 15, 1939, Serial No. 262,046

11 Claims. (Cl. 164—99)

This invention relates to machines for perforating motion picture film.

One object of our invention is to provide a machine which will rapidly and accurately perforate apertures in motion picture film. Another object of our invention is to provide a machine so constructed that there is a minimum wear on the punch and die members, and so constructed that the punch members may be readily sharpened and may be accurately assembled in position for use. Still another object of our invention is to provide a method of perforating motion picture film and a method for stripping the slugs punched part way through the motion picture film from the film, and other objects will appear from the following specification, the novel features being particularly pointed out in the claims at the end thereof.

Motion picture film has to receive rows of perforations down one or both margins of the film so that the film may be moved through a camera and through a projector, or so that film used for color printing or other purposes may be accurately registered. Color film, which sometimes requires a number of different color records to be accurately registered one with the other, has been particularly difficult to perforate because it is desirable to limit the manufacturing variation between sets of apertures to not more than plus or minus two-tenths of one-thousandth of an inch. With any film, it is, of course, desirable to have the perforations accurately spaced, since the apertures are the only means for registering the film, and if the spacing of the apertures vary, the resulting image or picture projected upon a screen being magnified many times will show considerable unsteadiness. In color pictures requiring a number of registered images, inaccuracy in the apertures may result in lack of sharpness and color fringes, as well as unsteadiness. It is, therefore, desirable to perforate film with a maximum amount of accuracy.

It is also, of course, desirable to perforate the film as rapidly as possible, because it is usually necessary to perforate the individual widths of film separately. That is, the 35 mm., 16 mm., 8 mm., or whatever width film is used, is run as a single band through a perforating machine, this operation being usually performed in total darkness.

It has been customary to perforate motion picture film with a gang perforator constructed to punch a series—usually not more than four apertures on each side in the case of 35 mm. film—at one time, after which the film is moved for the next group of apertures. It has also been customary to provide punches which definitely enter into die members so that not only are the punches subjected to wear in passing through the film, which wear is comparatively slight, but they are also subjected to the much greater wear which occurs through entering the dies. With such equipment, it has been necessary to frequently sharpen the punch members which must be lapped to the exact size and shape necessary by skilled workmen so that the film perforating mechanism has been expensive to build and maintain.

We have provided a rotary film punch which can produce film having apertures of the required accuracy and which can be run at a high speed as compared with the speed of the better known types of film perforators. Moreover, we have found that the punches are subjected to extremely little wear because they do not at any time enter the die members, but pass only part way through the film. For instance, in a film six thousandths of an inch thick, the punch members may pass five thousandths of an inch into the film, thrusting the slug member an equal distance into the die member. By passing the film over the die members and by moving it away from the die members in a different path, the slugs are retained by the dies as the punches themselves serve to move the film.

Coming now to the drawings wherein like reference characters denote like parts throughout:

Fig. 1 is a fragmentary side elevation showing a perforator constructed in accordance with and embodying a preferred form of our invention.

Fig. 2 is a fragmentary plan section of a typical film which may be punched on a machine constructed in accordance with our invention and by our improved method.

Fig. 3 is an enlarged view of a single motion picture film aperture of an approved shape.

Fig. 5 is a fragmentary sectional view of a somewhat more enlarged scale than Fig. 4, of a film perforator showing parts of the film punch and parts of a mating die member, as well as showing a portion of the film edge guide.

Fig. 6 is an enlarged fragmentary section showing the relationship of a number of punch members and die members with the film passing between these members.

Fig. 7 is a greatly enlarged fragmentary section showing the end of a punch member passing partially through the film and showing slugs carried by a die member punched from the film.

Fig. 8 is a fragmentary sectional view showing the film edge guide member which accurately positions the film near the area at which the film is perforated.

Figure 4:
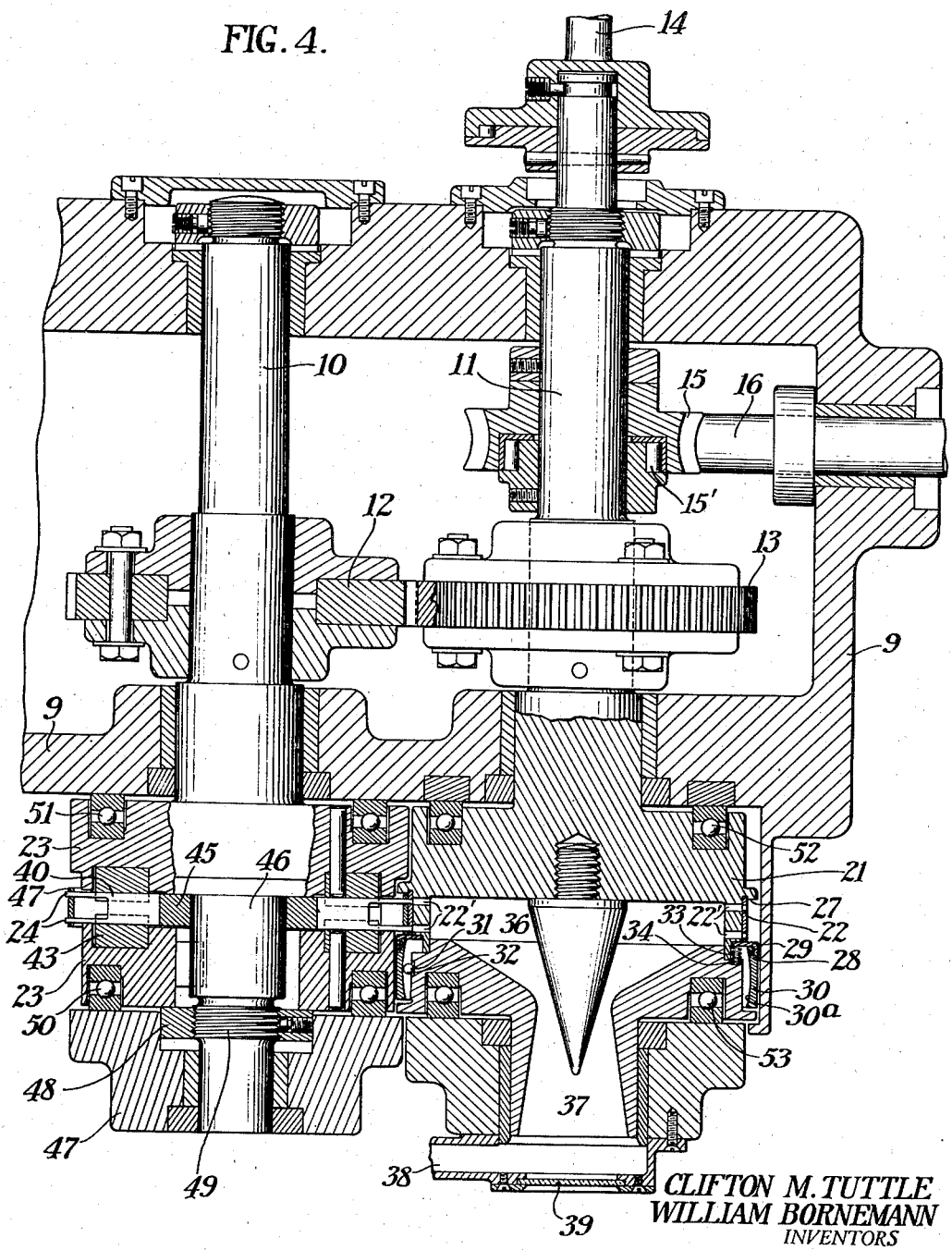
Fig. 4 is an enlarged section taken on line 4—4 of Fig. 1.

Our method of perforating film is to pass the film between punch and die members, the punches of which may pass substantially, but not all the way through the film, forcing the slugs so punched into die members and then passing the film and die members through separate paths so that the slugs partially forced into the die members may be stripped from the film, leaving clean, sharply formed perforations. We might point out that it is our theory that the punches in passing through the major portion of the film, as, for instance, through five-sixths of the total thickness thereof, cleanly cut the perforations from the film, even though this operation does not thrust the cut-out slug entirely out of the film, but only into the die members which always lie in accurate alinement with the punch members. We cannot be certain our theory is correct as to just why clean perforations are made with our rotary punch and die, and, therefore, we do not wish to be confined to the theory mentioned above. It is immaterial, however, as to whether or not the entire slug is cut or partially cut and partially broken from the film because in any event the film is firmly supported on the die member so that a perfectly clean and even edge is formed in the apertures.

A typical film is indicated in Fig. 2, wherein the film 1 is provided with apertures 2, these apertures being of the shape shown in Fig. 3 and having small curved portions 3 where the straight sides 4 come together at what would otherwise be the corners of the aperture. Such apertures are commonly used, and the film illustrated is of the type generally known as amateur or 16 mm. film. It is to be understood, of course, that the size, shape and type of aperture are entirely dependent upon the size and shape of the punch and die members, and that the film shown in Fig. 2 is merely one of the typical films which can be successfully perforated by our improved method and apparatus.

Referring to Fig. 1, a large roll of film 5 to be perforated may be mounted on a hub member 6 with a suitable type of edge guide member 7 for causing the film to unwind evenly. The hub member 6 may be supported upon a bracket 8, carried by the frame 9 of the machine, this frame supporting a pair of accurately alined shafts 10 and 11, as best illustrated in Fig. 4.

These shafts are mounted with great care, so that they will be exactly parallel and each shaft is provided with an accurately formed gear, gear 12 of shaft 10 meshing with gear 13 of shaft 11. One of these shafts is driven by a suitable source of power, as by shaft 14, so that the shafts 10 and 11 rotate at exactly the same speed when the machine is running. Shaft 11 may be provided with a worm 15, meshing with a suitable worm wheel on shaft 16, this shaft terminating in a wheel 17 and handle 18 which may be found convenient in setting up the machine. A one-way clutch 15 permits shaft 16 to remain stationary during normal operation and yet permits handle 18 to be used for manually turning the punch and dies for setting up or testing the machine.

The film 1 passes down from a supply roll 5 over a guiding pulley 19 into contact with the periphery 20 of the wheel 21, which carries the dies 22 equally spaced about the periphery of the wheel. Shaft 10 carries a wheel 23 which, in turn, carries the equally spaced punch members 24 which are spaced similarly to the die members 22. As these two wheels turn, as indicated particularly in Fig. 6, the punch members 24 approach, but never enter, the die members 22. Consequently, the film 1, being drawn around the guiding surface of wheel 21, has slugs S punched from the film partially into the die members, as indicated in this figure, so that when the film leaves the periphery 20 of the wheel, the slugs tend to remain in the die members, and the film 1, with the freshly punched apertures 2, moves away from the wheel 23, over a suitable roller guide 25, and thence to a suitable take-up 26.

It should be particularly noted that the path the film follows from the supply reel 5 to the take-up reel 26 is very suitable for film, because at no place does the film pass around a sharp bend, and consequently, the film can be moved at high speed without flexing it back and forth around tensioning or other rollers.

The film is definitely located on the wheel 21 by means of a shoulder 27 on one side, this shoulder being fixed, and by means of the annular member 28 which is preferably made L-shaped in cross-section and which is movably mounted on the opposite side. The annular member is provided with an annularly formed face plate 29 which is fastened to the ring member 30, the latter being supported on a plurality of balls 31 confined by slots 32 to a definite path. At spaced intervals, the face plate 29, as indicated in Fig. 8, is pressed by a plurality of springs 33 in the direction shown by the arrows, one end of each spring lying in a socket 34 in the ring 20 and the opposite end encircling a pin 35 carried by the face plate 29. Since the inner edge 30a of the ring member 30 is arcuate-shaped, the springs 33 tend to rotate the face plate 29, turning on the balls 31 so that the face plate will firmly, yet gently, press on that edge of the film which lies opposite the fixed film guide 27. This action always occurs over approximately the area of the film which is passing around the die member so that the portion of the film which is being perforated will always be held accurately in alinement on the die members and so that the rows of perforations will always lie in the correct position with respect to the edges of the film.

The periphery of the wheel 21, carrying the die members 22 is in the form of a ring, so that slugs S, being forced through the die members 22, will eventually drop through into the open space 36 in the inside of the die carrying ring, and these slugs may be drawn out through the opening 37 and through a suitable channel 38 in any desirable way. It is convenient to apply a slight vacuum to the pipe line 38, as this draws out the slugs lying loosely in the open space and also has the advantage of drawing out any dust which may accumulate. If desired, a window 39 may be placed in the pipe line 38, so that an operator can see that this part of the machine is functioning. An important feature of our perforating machine is the fact that since the punch members 34 do not enter the die members 22, they do not need to be sharpened, except at rare intervals. However, it is necessary to carry these punch members in such a manner that they can be readily assembled and disassembled for the sharpening operation, when necessary, and for initially setting up the machine.

As indicated in Fig. 5, the punch members 24 are carried preferably integrally by a base plate 40 having accurately formed edge members 41 which are adapted to lie in the radial and complementary-shaped grooves 42 formed in the annular members 43, as best shown in Fig. 6. These annular members are carefully grooved, so that the grooves will be radially arranged and accurately spaced, and so that the base plates 40 have a tight sliding fit therewith. The end wall 44 of the base plate locates the plate radially of the wheel 23 by resting on a collar 45 which has a tight fit on the shaft 46 so that when the base of the punch member rests on this collar, the outer ends of the punches are accurately located with respect to the center of rotation.

If it should be desired to sharpen the punches by grinding down their cutting faces a distance of, say, five-thousandths of an inch, a collar 45, having a diameter ten-thousandths of an inch greater than the original collar is slipped onto the shaft 46 so that the outer ends of the punch members will lie in exactly the same position with respect to the die members 22.

To disassemble the punch members 24, the annular bearing plate 47 and the nut 48 are removed, the nut being unscrewed from a threaded area 49 of the shaft 46. This permits the wheel 23 to be removed, or at least the outer section of the wheel 23, since this wheel is made in two quite similar parts which clamp, by the annular members 43, the punch members in place. The punch members may then be slid out of their respective grooves so that the assembling operation is by no means difficult and at the same time, the punches are accurately held in place.

It should be noticed that with the form of punch shown in Fig. 6, there is an outer punch guiding annular member 47 which is preferably arranged close to the operative face of the punches to guide these members and hold them rigidly in position.

In the form of our invention shown in Fig. 6, we have spaced the punch carrying wheel a distance of approximately seven-thousandths of an inch, since in this embodiment, a film of six-thousandths of an inch is to be punched and the punch members project five-thousandths of an inch into the film when the film reaches the punching position, also shown in this figure. The distance between these wheels is, of course, governed by the thickness of the film, in part, for although the distance cannot be less than the greatest thickness of the film to be punched, it may be considerably more. For instance, it would be possible to space the ring member 47 a much greater distance from the wheel 23, although, if this is done, the ends of the punch members 24 will not be guided so close to their cutting edges as in the present embodiment. It is, of course, always desirable to guide the punch members near their cutting face in order to reduce to a minimum any vibration which may occur in the punch members which are not so guided.

Since the film passes through a relatively smooth path without encountering any sharp turns, and since it may be moved continuously, we have been able to perforate film in the neighborhood of five hundred feet a minute, which is somewhere near ten times the speed of the ordinary perforating machine. Moreover, since the punch members approach, but do not enter, the die members, there is but little wear on these parts as compared with the usual reciprocating punches which must move into and out of the dies for each perforation.

Referring to Figs. 5 and 7, it may be seen that the punch member 24 passes nearly through the film 1, so that the slug S is forced down into the die member 22 the greater portion of its thickness. Thus, when the film 1 is moved away from its punching position by the punch members 24 serving as teeth to engage the apertures, the film is stripped away from the supporting wheel 22 of the die members and the slugs S remain in the dies. As soon as the dies become full of slugs, they fall down through the apertures 22' and into the hollow space 36 which was above described.

Our method of moving the film through one path while passing the slugs through a second path to strip the slugs from the film, provides a positive way of removing the slugs so that they may not, by being caught between convolutions of the film, mar the sensitive surface of the film.

As indicated in Fig. 4, the pair of spaced sections forming the wheel 23 are rigidly positioned between the frame 9 of the machine and the collar 47 of the machine between two sets of ball-bearings 50 and 51. These are arranged so that the parts will rotate smoothly with minimum vibration. Similar sets of roller bearings 52 and 53 are used for holding the die carrying wheel 20 in exact alinement with the punch carrying wheel 23.

Referring to Fig. 1, as the film is moved by the punch members 24 engaging the apertures 2, it passes around a comparatively small arc of the wheel 23 from which it passes directly to the guide roller 25. A wedge-shaped film stripper 55 is positioned so that in threading the machine, it will be impossible to permit the film to continue around with the punch carrying wheel 23, and so that it will have to be properly threaded over the guide roll 25. The stripper 55 is positioned so that it does not normally contact with the film, although there may be a small roller 56 for guiding the film past the stripper, if this should be considered necessary.

From the above description of our invention, it will be seen that the film passes in a comparatively smooth path free from sharp turns between rotary punching members, so that the film may be run at a high speed without damage to the film during the perforating operation. The punch and die members are so arranged that they will accurately perforate the film as it is drawn between these members by the punches serving as teeth to engage the film apertures and move the film between these punching members. The punch members rarely require sharpening, but this operation can be readily taken care of where necessary, without disturbing the delicate relation between the punching ends of the punches and the die members which, of course, must always be in extremely accurate alinement.

What we claim is:

1. A motion picture film perforator comprising a pair of spaced rotary drums, gearing for turning the drums at the same speed, one drum including a plurality of punches extending from the drum toward the other drum a distance such that they approach but cannot contact with the other drum, a plurality of dies carried by the other drum complementary in shape and area to the punches and in accurate alignment with said punches and adapted to at least partially receive slugs punched from a film by said punches, and means for guiding a film over the die carrying drum in a predetermined relationship to the dies.

2. A motion picture film perforator comprising a pair of spaced rotary drums, gearing for turning the drums at the same speed, one drum including a plurality of punches extending from the drum toward the other drum a distance such that they approach but cannot contact with the other drum, a plurality of dies carried by the other drum complementary in shape to the punches and in alignment with said punches and adapted to at least partially receive slugs punched from a film by said punches, and means for guiding a film over the die carrying drum in a predetermined relationship to the dies comprising a relatively fixed guide for one film edge, and a resilient guide carried to rotate with the drum for pressing on the opposite edge of the film to hold said film against the relatively fixedly mounted film guide.

3. A motion picture film perforator comprising a pair of spaced rotary drums, gearing for turning the drums at the same speed, one drum including a plurality of punches extending from the drum toward the other drum a distance such that they approach but cannot contact with the other drum, a plurality of dies carried by the other drum complementary in shape to the punches and in alignment with said punches and adapted to at least partially receive slugs punched from a film by said punches, and means for guiding a film over the die carrying drum in a predetermined relationship to the dies comprising a relatively fixed edge guiding member, and a resiliently mounted ring presser member carried by the drum for pressing the film thereagainst.

4. A motion picture film perforator comprising a pair of spaced rotary drums, gearing for turning the drums at the same speed, one drum including a plurality of punches extending from the drum toward the other drum a distance such that they approach but cannot contact with the other drum, a plurality of dies carried by the other drum complementary in shape to the punches and in alignment with said punches and adapted to at least partially receive slugs punched from a film by said punches, and means for guiding a film over the die carrying drum in a predetermined relationship to the dies comprising a relatively fixed edge guiding member, and a resiliently mounted ring presser member carried by the drum for pressing the film thereagainst said ring presser member comprising a rigid ring, a plurality of ball mounts for the ring and a plurality of springs tending to rock the ring on the balls against the film to hold the film against the relatively fixed film guide.

5. A motion picture film perforator comprising a pair of spaced rotary drums, gearing for turning the drums at the same speed, one drum including a plurality of punches extending from the drum toward the other drum a distance such that they approach but cannot contact with the other drum, a plurality of dies carried by the other drum complementary in shape to the punches and in alignment with said punches and adapted to at least partially receive slugs punched from a film by said punches, and means for guiding a film over the die carrying drum in a predetermined relationship to the dies comprising a relatively fixed edge guiding member, and a resiliently mounted ring presser member carried by the drum for pressing the film thereagainst said ring pressure member including a ring, an arcuate inner ring surface, balls resting against said arcuate surface and mounted on the die carrying drum, and a plurality of springs spaced about the periphery of the ring for resiliently thrusting the ring toward the relatively fixed film guide whereby a film strip is definitely located relative to the punches and dies.

6. A motion picture film perforator comprising a pair of drums intergeared to rotate at the same speed, film guiding surfaces on each drum spaced apart a distance not less than the thickness of a film, a plurality of punches carried by one drum and a plurality of complementary shaped dies carried by the other drum positioned in alignment with said punches so that said punches may closely approach said dies without entering said dies, whereby slugs from a film passing therebetween may be pressed by the punches passing partially through the film at least partially into said dies, said dies stripping the slugs from the film as the film leaves the dies.

7. A motion picture film perforator comprising a pair of rotary punch and die members, gears for rotating the punch and die members together, a plurality of radially arranged pairs of guideways in one rotary member, a plurality of supports having edges snugly fitting the radial guideways and frictionally carried therein, punches carried by the supports, the ends of the punches being accurately spaced from the supports, and an annular member carried by the rotary member forming a seat for locating the inner edges of the punch supports, the ends of the punches projecting a short distance from the rotary punch carrying member, the rotary die carrying member being spaced from the rotary punch carrying member a distance not less than the distance the punches project from the rotary punch member, whereby the punch and die members may closely approach each other without contacting as they are rotated together.

8. A motion picture film perforator comprising a pair of rotary drums spaced approximately the thickness of a motion picture film, one drum including a plurality of radially spaced punches projecting from the drum a distance not greater than the thickness of said film, the other drum including a plurality of complementary shaped dies, means for accurately positioning the dies with respect to said punches to receive slugs punched from the film, said punch members closely approaching but not entering the dies as the drums rotate, whereby the slugs may be stripped from the film as the film passes through one path, the slugs, at least partially pressed into the dies, being carried by the dies through a separate path from the film.

9. The method of perforating motion picture film which consists in moving a film continuously through a fixed path and pressing slugs from the moving film substantially through the film and passing the film and slugs through different paths thereby stripping the slugs from the film without a further cutting operation.

10. The method of perforating motion picture film which consists in supporting a section of said film and punching a slug part way through said film by a tool especially adapted for such operation, said slug being pushed part way into an aperture in the film support especially adapted to receive said slug and moving said film away from the support to completely remove the slug through the adherence of the slug to the aperture of the support.

11. A method of perforating motion picture film comprising moving a film through a path, punching apertures in the film by a punch member penetrating the film less than the total thickness thereof while supporting the film over a die member whereby said slug may be driven into the die member a distance substantially equal to the penetration of the punch member into the film, and stripping the slug from the film through the adherence of the slug to the die member by moving the film from the die member.

CLIFTON M. TUTTLE.
WILLIAM BORNEMANN.